(12) United States Patent
Finkbeiner et al.

(10) Patent No.: US 7,322,609 B2
(45) Date of Patent: Jan. 29, 2008

(54) ENERGY ABSORBING STRAP WITH VARIABLE PULL LOADS

(75) Inventors: Steven P. Finkbeiner, Essexville, MI (US); Yoshio Mori, Iruma (JP)

(73) Assignee: Delphi Technologies, Inc., Troy, MI (US)

( * ) Notice: Subject to any disclaimer, the term of this patent is extended or adjusted under 35 U.S.C. 154(b) by 387 days.

(21) Appl. No.: 10/914,833

(22) Filed: Aug. 10, 2004

(65) Prior Publication Data

US 2006/0033320 A1     Feb. 16, 2006

(51) Int. Cl.
    *B62D 1/18*     (2006.01)
(52) U.S. Cl. ........................... 280/777; 188/374
(58) Field of Classification Search ............. 280/777; 188/374
    See application file for complete search history.

(56) References Cited

U.S. PATENT DOCUMENTS

| | | | |
|---|---|---|---|
| 3,948,539 A * | 4/1976 | Murase et al. | 280/777 |
| 5,082,311 A * | 1/1992 | Melotik | 280/777 |
| 5,738,377 A * | 4/1998 | Sugiki et al. | 280/777 |
| 5,775,172 A * | 7/1998 | Fevre et al. | 74/492 |
| 5,788,278 A * | 8/1998 | Thomas et al. | 280/777 |
| 5,909,920 A * | 6/1999 | Dalinkiewicz | 296/24.4 |
| 5,961,146 A * | 10/1999 | Matsumoto et al. | 280/777 |
| 6,170,874 B1 | 1/2001 | Fosse | |
| 6,189,929 B1 | 2/2001 | Struble et al. | |
| 6,322,103 B1 | 11/2001 | Li et al. | |
| 6,378,903 B1 * | 4/2002 | Yabutsuka et al. | 280/777 |
| 6,394,241 B1 | 5/2002 | Desjardins et al. | |
| 6,523,432 B1 * | 2/2003 | Yamamoto et al. | 74/492 |
| 6,641,167 B2 | 11/2003 | Riefe et al. | |
| 6,652,002 B2 | 11/2003 | Li et al. | |
| 6,749,221 B2 | 6/2004 | Li | |

* cited by examiner

*Primary Examiner*—Paul N. Dickson
*Assistant Examiner*—Leonard McCreary, Jr.
(74) *Attorney, Agent, or Firm*—Michael D. Smith

(57) ABSTRACT

An apparatus includes first and second steering column members disposed for movement relative to one another. The apparatus also includes an anvil associated with one of the first and second steering column members. The anvil is spaced from the other of the first and second steering column members. The apparatus also includes a strap having a mounting end fixedly associated with the other of the first and second steering column members. The strap also includes a free end spaced from the mounting end. The strap is drawable over the anvil in response to movement between the first and second steering column members. The strap also includes a slot extending away from the mounting end to the free end. The slot has a length and a variable width along at least a portion of its length.

14 Claims, 2 Drawing Sheets

POSITION

ENERGY ABSORBING STRAP WITH VARIABLE PULL LOADS

FIELD OF THE INVENTION

The invention relates to a steering column and more particularly to an energy absorbing strap that is associated with a steering column to dissipate energy in response to movement of the steering column.

BACKGROUND OF THE INVENTION

Steering column assemblies for vehicles often include kinetic energy absorption devices that act to control the collapse of the column in the event of a crash to reduce the likelihood of injury to the driver. One form of an energy absorbing device comprises a metal strap that is bent and drawn over an anvil to absorb kinetic energy of a collapsing column. Examples of this type of energy absorbing device include U.S. Pat. Nos. 6,170,874; 6,189,929; 6,322,103; and 6,652,002. The rate of energy dissipation can be adjusted, as shown in U.S. Pat. Nos. 6,749,221; 6,652,002; and 6,641,167.

FIG. 1 shows an example of a strap 10. The strap 10 includes connecting portion 12 for connecting the strap 10 to a steering column or to a vehicle. The connecting portion 12 defines an aperture 14. The aperture 14 receives a fastener such as bolt. The strap 10 also includes a bent portion 16. During installation of the strap 10 in the vehicle, the bent portion 16 is disposed around an anvil. When the steering column moves relative to the vehicle, the bent portion 16 moves along the length of the strap 10. The strap 10 also includes a slit 18 extending between the connecting portion 12 and a distal end 20 of the strap. The effects of the slit 18 include reducing the weight of the strap 10 and reducing the rate of energy absorbed by the strap 10 during movement of the steering column relative to the vehicle.

SUMMARY OF THE INVENTION AND ADVANTAGES

The invention provides an apparatus including first and second steering column members disposed for movement relative to one another. The apparatus also includes an anvil associated with one of the first and second steering column members. The anvil is spaced from the other of the first and second steering column members. The apparatus also includes a strap having a mounting end fixedly associated with the other of the first and second steering column members. The strap also includes a free end spaced from the mounting end. The strap is drawable over the anvil in response to movement between the first and second steering column members. The strap also includes a slot extending away from the mounting end to the free end. The slot has a length and a variable width along at least a portion of its length.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
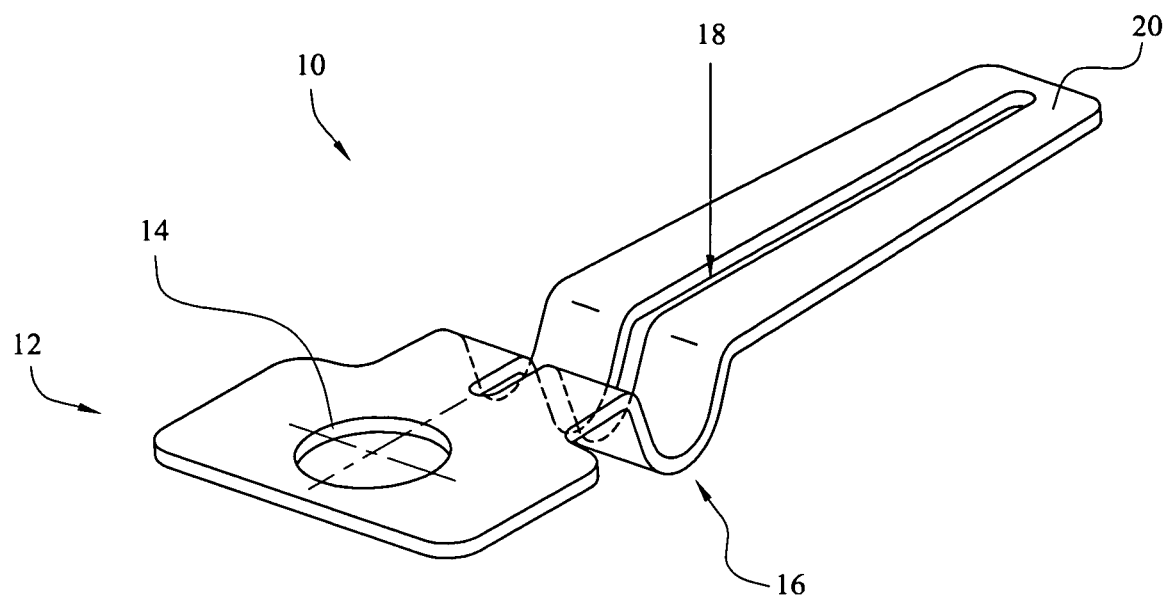
FIG. 1 is a perspective view of a known strap.
Figure 2:
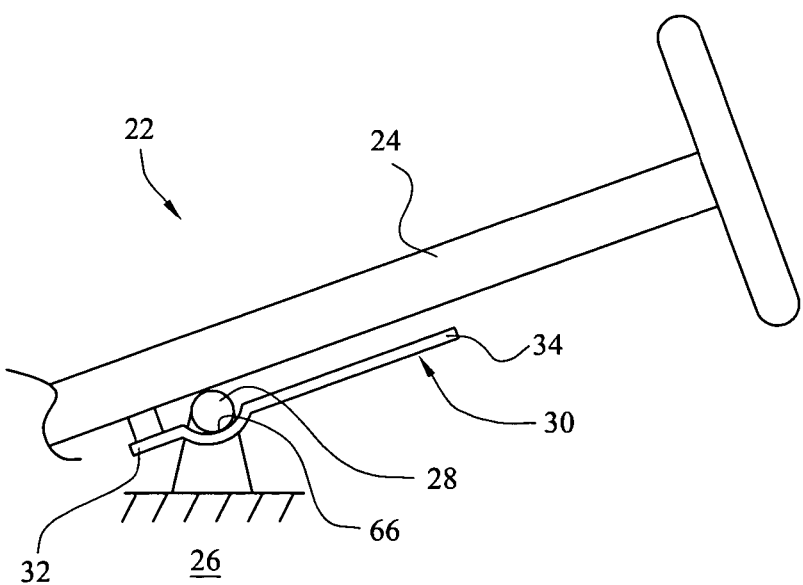
FIG. 2 is planar view of a steering column including a strap according to the exemplary embodiment of the invention.
Figure 3:
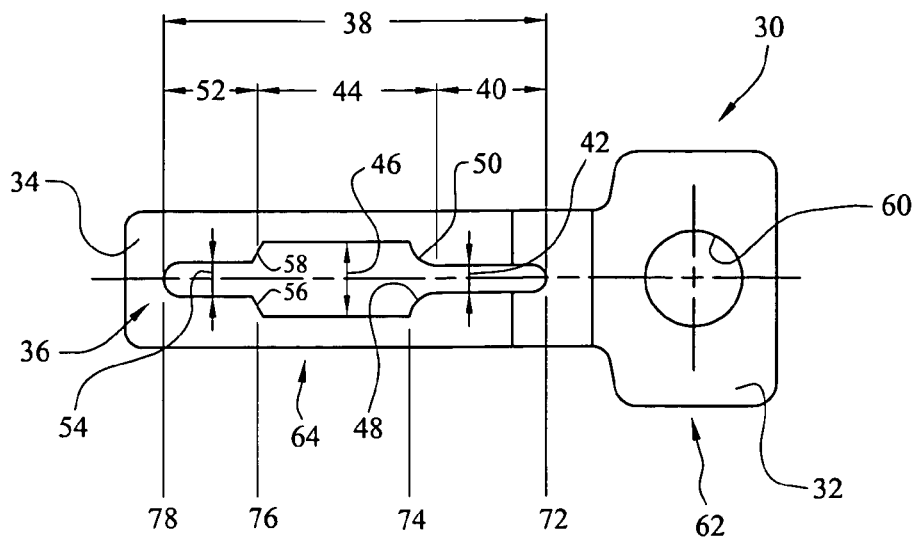
FIG. 3 is a top view of the strap shown in FIG. 2.
Figure 4:
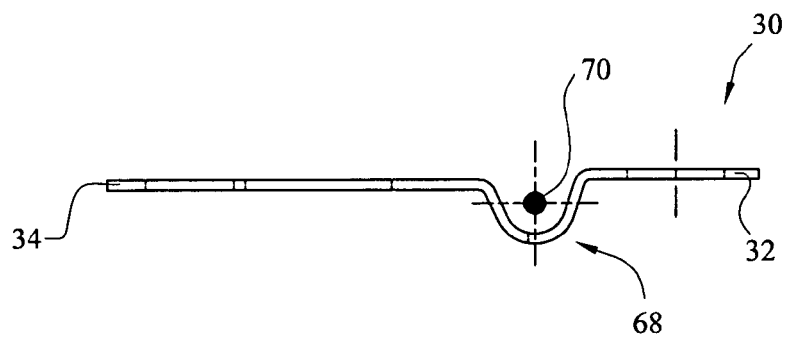
FIG. 4 is a side view of the strap shown in FIGS. 2 and 3.

Referring now to FIGS. 2-5, the exemplary embodiment of the invention includes an apparatus 22 having first and second steering column members 24, 26 disposed for movement relative to one another. The first steering column member 24 is a steering column and the second steering column member 26 is fixedly associated with a vehicle. In alternative embodiments of the invention, the first and second steering column members 24, 26 could both be moveable relative to the vehicle. The apparatus 22 also includes an anvil 28 associated with one of said first and second steering column members 24, 26 and spaced from the other of said first and second steering column members 24, 26. The anvil 28 is fixedly associated with the second steering column member 26. In alternative embodiments of the invention, the anvil 28 could be fixedly associated with the second steering column member 24. The apparatus 22 also includes a strap 30 having a mounting end 32 fixedly associated with the other of said first and second steering column members 24, 26. The mounting end 32 and anvil 28 are fixedly associated with opposite steering column members 24, 26. The strap 30 also includes a free end 34 spaced from the mounting end 32. The strap 30 is drawable over the anvil 28 in response to said movement between the first and second steering column members 24, 26. The strap 30 includes a slot 36 extending away from the mounting end 32 to the free end 34. The slot 36 has a length 38 and a variable width along at least a portion of the length 38.

Energy is dissipated when the strap 30 is drawn over the anvil 28. The configuration of the slot 36 can be adjusted to change a rate of the energy dissipated. Furthermore, the configuration of the strap 30 can be adjusted as well to change the rate of the energy dissipated.

In the exemplary embodiment of the invention, the slot 36 extends along a portion of the strap 30 having a substantially constant width. In alternative embodiments of the invention, the strap 30 could have a variable width. The length 38 includes a first length 40 having a first width 42 and a second length 44 having a second width 46. The first and second widths 42, 46 are different from one another. The rate of energy dissipation changes in inverse relation to the width of the slot 36. In other words, as the width of the slot 36 increases the rate of energy dissipation decreases.

A pair convex shoulders 48, 50 is defined between the first and second lengths 40, 44. The pair of convex shoulders 48, 50 are disposed on opposite sides of the slot 36. The length 38 also includes a third length 52 having a third width 54. The second length 44 is disposed between the first and third lengths 40, 52. The third and second widths 46, 54 are different from one another. A pair of chamfers 56, 58 are defined between the second and third lengths 44, 52. The pair of chamfers 56, 58 are disposed on opposite sides of the slot 36.

The strap 30 includes an aperture 60 spaced from the slot 36. A fastener, such as bolt, can be inserted in the aperture to fixedly associated the strap 30 with one of the first and second steering column members 24, 26. The strap 30 also includes a first portion 62 which defines the mounting end 32 and second portion 64 which defines the free end 34. The second portion 64 is of substantially constant width.

The anvil 28 defines a bending surface 66. The second portion 64 of the strap 30 includes a bend portion 68 correspondingly shaped with respect to the bending surface 66. The slot 36 extends, at least partially, along the bend portion 68. The bend portion 68 extends around a longitudinal axis 70 and the slot 36 extends transverse to the longitudinal axis 70. The first length 40 is closer to the bend portion 68 than said second and third lengths 44, 52.

Figure 5:
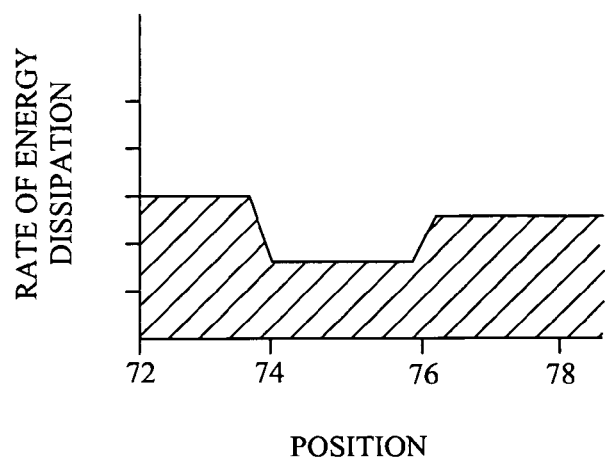
FIG. 5 is a graph illustrating the relationship between the force required to draw the strap according to the exemplary embodiment of the invention over an anvil over the distance of travel of the strap.

As set forth above, the configuration of the slot 36 can be adjusted to change a rate of the energy dissipated. The graph shown in FIG. 5 illustrates the changes in the rate of energy dissipation as the strap 30 is pulled over the anvil 28. The positions 72, 74, 76, 78 along the length 38 of the strap in FIG. 3 correspond to the positions 72, 74, 76, 78 along the x-axis of the graph.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
    first and second steering column members disposed for movement relative to one another;
    an anvil associated with one of said first and second steering column members and spaced from the other of said first and second steering column members with said anvil defining a bending surface;
    a strap having a first portion defining a mounting end fixedly associated with said other of said first and second steering column members and a second portion of substantially constant width and constant thickness having a free end spaced from said mounting end defining a length of said strap wherein said strap is drawable over said anvil in response to said movement and wherein said strap includes a slot formed in said second portion and extending away from said mounting end along at least a portion of said length and having a variable width;
    said strap extending along a first length at a first width, a second length at a second width, and a third length at a third width with said second length disposed between said first and third lengths and said second width being greater than said first and third widths to define a greater rate of energy dissipation when said first and third lengths are drawn over said anvil relative to when second length is drawn over said anvil: and
    said second portion of said strap including a bend portion disposed about said bending surface and correspondingly shaped with respect to said bending surface for facilitating said energy dissipation as said strap is drawn over said anvil.

2. The apparatus of claim 1 wherein said slot extends along a portion of said strap having a substantially constant width.

3. The apparatus of claim 1 including a pair convex shoulders defined between said first and second lengths.

4. The apparatus of claim 3 including a pair of chamfers defined between said second and third lengths.

5. The apparatus of claim 1 wherein said slot defines at least one convex shoulder.

6. The apparatus of claim 5 wherein said at least one convex shoulder includes pair of convex shoulders disposed on opposite sides of said slot.

7. The apparatus of claim 1 wherein said slot defines at least one chamfer.

8. The apparatus of claim 7 wherein said at least one chamfer includes a pair of chamfers disposed on opposite sides of said slot.

9. The apparatus of claim 1 wherein said strap includes an aperture spaced from said slot.

10. The apparatus of claim 1 wherein said slot extends, at least partially, along said bend portion.

11. The apparatus of claim 10 wherein said bend portion extends around a longitudinal axis and wherein said slot extends transverse to said longitudinal axis.

12. The apparatus of claim 1 wherein said first length is closer to said bend portion than said second and third lengths.

13. The apparatus of claim 12 including a pair of opposing convex shoulders defined between said first and second lengths.

14. The apparatus of claim 13 including a pair of opposing chamfers defined between said second and third lengths.

* * * * *